United States Patent
Eynard et al.

(10) Patent No.: US 7,021,352 B2
(45) Date of Patent: Apr. 4, 2006

(54) TIRE BEAD PROTECTION

(75) Inventors: Claude Eynard, Peyriac-de-Mer (FR);
Jean-Claude-John Faure, Mozac (FR);
Bertrand Imbert, Santa Croce di Cervasca (IT); André Peyrot, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/103,442

(22) Filed: Apr. 12, 2005

(65) Prior Publication Data

US 2005/0178487 A1 Aug. 18, 2005

Related U.S. Application Data

(63) Continuation of application No. PCT/EP03/11301, filed on Oct. 13, 2003.

(30) Foreign Application Priority Data

Oct. 16, 2002 (FR) .................................... 0212892

(51) Int. Cl.
*B60C 15/00* (2006.01)
*B60C 15/06* (2006.01)
(52) U.S. Cl. ...................... 152/547; 152/552
(58) Field of Classification Search ............... 152/547, 152/552
See application file for complete search history.

(56) References Cited

U.S. PATENT DOCUMENTS

| 5,971,047 | A | 10/1999 | Drieux et al. |
| 6,779,574 | B1 * | 8/2004 | Teeple et al. ........... 152/547 X |
| 2005/0016655 | A1 | 1/2005 | Pereira et al. |

FOREIGN PATENT DOCUMENTS

| FR | 2 804 906 | 8/2001 |
| WO | WO 99/64258 | 12/1999 |
| WO | WO 02/068220 | 9/2002 |

* cited by examiner

Primary Examiner—Adrienne C. Johnstone
(74) Attorney, Agent, or Firm—Buchanan Ingersoll PC

(57) ABSTRACT

A tire comprising:
two beads intended to be in contact with a mounting rim (J), at least one of the said beads having a bead seat inclined towards the outside, this bead comprising an anchoring device formed by at least one circumferential bead reinforcement element and a wedge substantially triangular in shape,
a radial carcass reinforcement having an upturn extending over or in the wedge,
and axially outside the lateral face of the wedge, a protuberance made from rubber mix provided for axially protecting the rim (J) against abrasion and impacts when the tire is mounted on the latter,
each bead comprising, between the axially external protuberance of the said bead and the lateral face of the wedge, a bead protection profile with a thickness of at least 0.3 mm made from rubber mix whose modulus at 10% deformation is greater than the modulus of the material constituting the protuberance.

10 Claims, 2 Drawing Sheets

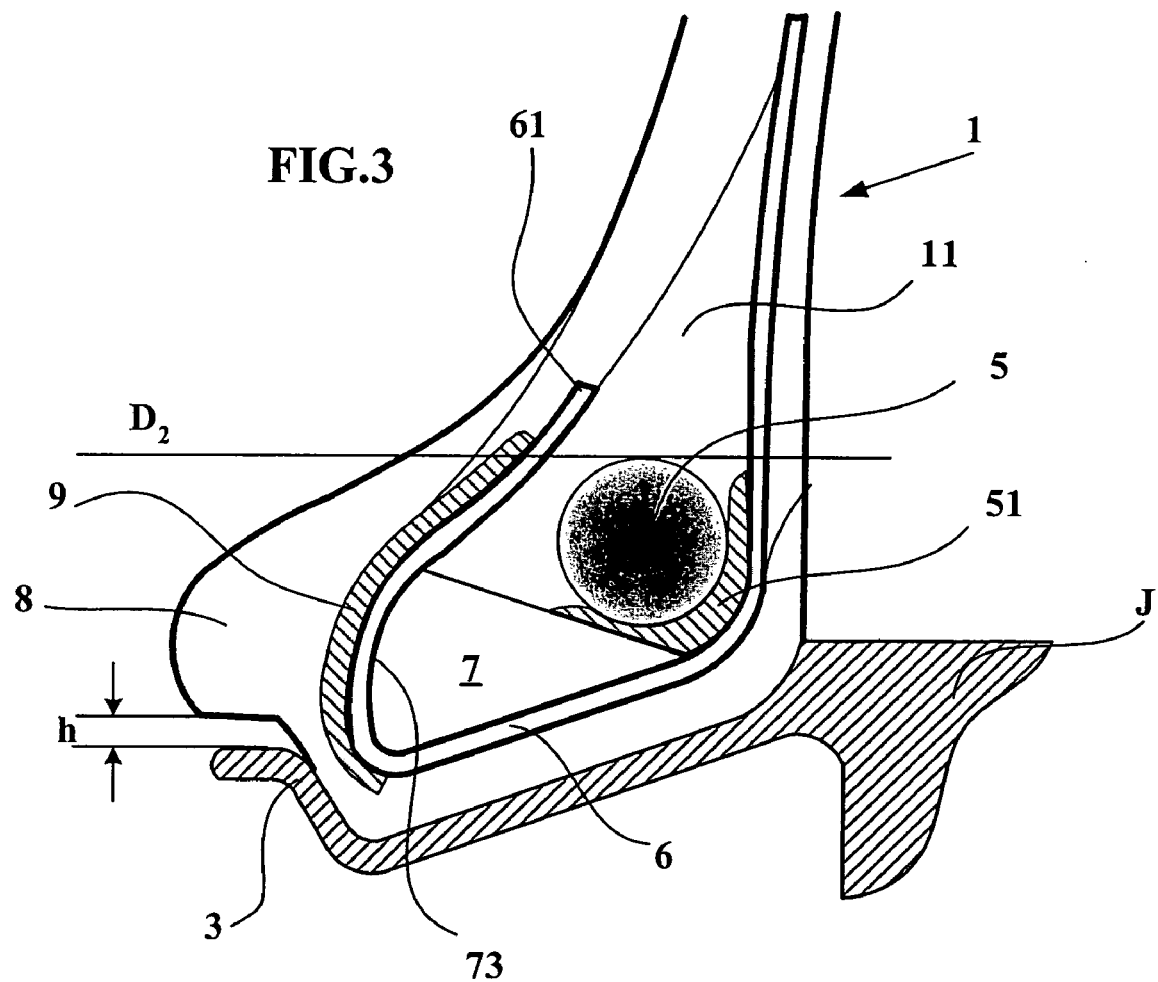

TIRE BEAD PROTECTION

This application is a continuation of International Application Serial No. PCT/EP03/011301 filed on Oct. 13, 2003, and which published under Document WO 2004/035328 on Apr. 24, 2004, designating the U.S.

BACKGROUND OF THE INVENTION

1. Field of the Invention

The present invention concerns a tire with radial carcass reinforcement intended to be mounted on a rim, at least one seat of which is inclined towards the outside and is extended axially to the outside by a low projection. It concerns more particularly the beads of such a tire.

2. Description of the Related Prior Art

A bead intended to be mounted on a rim, at least one seat of which is inclined towards the outside, is described for example in the international publication WO 95/23073. The rim described in this publication comprises an external wall whose portion axially towards the outside is axially recessed with respect to the low projection on the rim. Consequently, this rim part axially furthest towards the outside does not benefit from any protection by the tire against attacks caused, for example, by rubbing against pavements during travel in town. The architecture, that is to say the structure, of this type of tire rim is described in the international publication WO 95/23073 and comprises in particular a part forming a "heel" designed so as to be situated axially towards the inside and a bead toe designed so as to be situated axially towards the outside when the tire is mounted on its mounting rim.

This tire also comprises a carcass reinforcement, the ends of which are anchored in each bead to an anchoring device, the said anchoring device being formed from at least one circumferential rim reinforcement element (such as a bead wire or a set of wires or cables wound circumferentially) and a wedge made from a mixture of high-hardness rubber and substantially triangular in shape. This wedge is, seen in section in a meridian plane (that is to say a plane containing the rotation axis of the tire), delimited by a radially external lateral face and a radially internal face and finally a face connecting the above two faces and situated axially to the outside, so that the vertex of the wedge opposite to the said lateral face is situated radially towards the inside of the circumferential bead reinforcement. The carcass reinforcement is anchored at each of its ends on the said anchoring device by means of an upturn which, at least partially, winds around the circumferential bead reinforcement element and is extended in or around the wedge made from a mixture of high-hardness rubber.

The fact that it is wished to provide satisfactory protection of the rim against various impacts and friction has led to adapting the axially external shape of the bead, an adaptation consisting of providing an addition volume of rubber mixture so that this additional volume prevents contact of the axial external projection on the rim with any external object.

Though this additional volume, forming a protuberance on each bead mounted on a rim seat inclined towards the outside, effectively protects the corresponding projection on the rim, it is of course liable to be subjected to a phenomenon of abrasion when the tire rubs against an external object, in particular a pavement. International application WO 99/64258 published on 16 Dec. 1999 teaches providing this protuberance with a plurality of incisions of non-zero width and with a depth of no more than 5 mm, these incisions delimiting a plurality of ribs parallel to each other and spaced apart evenly in the circumferential direction.

This latter construction, though it is favorable with regard to the abrasion aspect, nevertheless still presents a few drawbacks which the present invention seeks to resolve. This is because it has been found that, under extreme conditions, detachment of localized material could occur over a greater or lesser thickness. In certain cases, the thickness is such that the wedge of the anchoring device is laid bare and possibly the reinforcements of the carcass reinforcement are also. The carcass reinforcements are then no longer protected from external agents (water, air etc).

SUMMARY OF THE INVENTION

The aim of the invention is to propose a solution for preventing the laying bare of the carcass reinforcements whilst maintaining protection of the rim by the tire itself.

The tire according to the invention comprises:

two beads, where at least one bead has a bead seat inclined towards the outside, that is to say such that, with respect to the rotation axis of the tire, the points on the said seat axially furthest towards the inside of the tire are further away from the rotation axis than the points on the same seat axially furthest towards the outside of the tire, this rim comprising an anchoring device formed by at least one circumferential bead reinforcement element and a wedge made from rubber material (A) with high rigidity (that is to say having a modulus at 10% deformation of at least 25 MPa) and with a substantially triangular shape delimited by a face radially to the outside, a face radially to the inside and a lateral face axially to the outside connecting the above two faces and the vertex opposite to the face axially to the outside of the wedge being situated radially under the circumferential bead reinforcement element, a radial carcass reinforcement formed from a rubber mix (B) reinforced with a plurality of reinforcements (wires, cables) forming, in the tire, an angle equal to or close to 90° to the circumferential direction, this carcass reinforcement being anchored in each bead having a seat inclined towards the outside on an anchoring device, passing radially inside the circumferential bead reinforcement element and going from the inside towards the outside of the tire in order to form an upturn extending over or in the wedge made from a mixture of rubber, and, axially to the outside of the lateral face of the wedge, a protuberance made from rubber mix (C) forming the portion axially furthest towards the outside of each bead having a seat inclined towards the outside, the material (C) employed being chosen so as to be resistant to abrasion and to impacts so as to axially protect the rim when the tire is mounted on its rim.

This tire is also characterized in that each bead, having a seat inclined towards the outside, comprises, between the protuberance axially towards the outside of the said bead and the lateral face of the wedge axially towards the outside, a bead protection profile with a thickness at least equal to 0.3 mm made from rubber mix (D) with a modulus at 10% of deformation greater than the modulus of the material constituting the said protuberance, the modulus at 10% of deformation of the material forming the said protuberance being between 8 and 20 MPa.

The bead protection profile can be in the form of a layer of rubber of uniform thickness and at least equal to 0.3 mm, one of the external faces of which is preferentially in contact with the face axially towards the inside of the protuberance made from material (C). By virtue of the characteristics stated, when a violent impact occurs, causing a break and a tearing away of part of the axially external protuberance, the detachment of the said part takes place on the axially external face of the bead protection profile, which remains in place and then protects the wedge and the carcass reinforcement.

In order to keep a greater thickness for the said bead protection profile, it is possible to give it any appropriate shape (for example a local protrusion).

The combination of the presence of a protective profile made from rubber mix radially to the outside of the wedge and the carcass reinforcement and the choice of physical properties of this material compared with those of the rubber mixes of the protuberance and wedge and the carcass reinforcement results in sufficient protection of the said reinforcement since it has been found that this structure affords better resistance of the bead (and protuberance) to tearing away and better protection of the carcass even following localized tearing away (it is found that the rupture surface is situated on the surface furthest to the outside of the protective profile.

This protective profile can also at least partly cover one of the radially internal or external faces of the wedge. Where the upturn of the carcass reinforcement is situated on at least one of the faces of the wedge, the protective profile covers the upturn.

Advantageously, the protective profile covers the radially external face of the wedge and is extended between the said wedge and the circumferential reinforcement elements of the bead in order to extend to a greater or lesser distance axially inside the said elements.

In the case where the circumferential bead reinforcement elements form a bead wire, it is possible to place a mixture of rubber serving as an interface between the bead wire and the reinforcements of the carcass reinforcement. Preferentially, this mixture of rubber has a modulus at 10% deformation which is at least equal to the modulus of the mixture of the protuberance. Advantageously, the bead protection profile can be extended over the external face of the wedge in order to pass between the bead wire and the carcass reinforcement.

To increase the protection still further, it is possible to incorporate a material composing the protective profile for the reinforcements in the form of fibers or wires or cables, metallic or textile, or fabrics of the same elements taken alone or in combination.

BRIEF DESCRIPTION OF THE DRAWINGS

The characteristics of the invention will be better understood by means of the drawings, accompanying the description which follows, non-limiting illustrating example embodiments of a tire according to the invention. These drawings comprise:

FIG. 3: view in meridian section of a third variant embodiment according to which the upturn of the carcass reinforcement is extended radially outside the wedge of the anchoring device.

DESCRIPTION OF THE PREFERRED EMBODIMENTS

For convenience, the same reference signs are employed for the figures showing distinct variants provided that they designate elements identical at least in their function.

Figure 1:
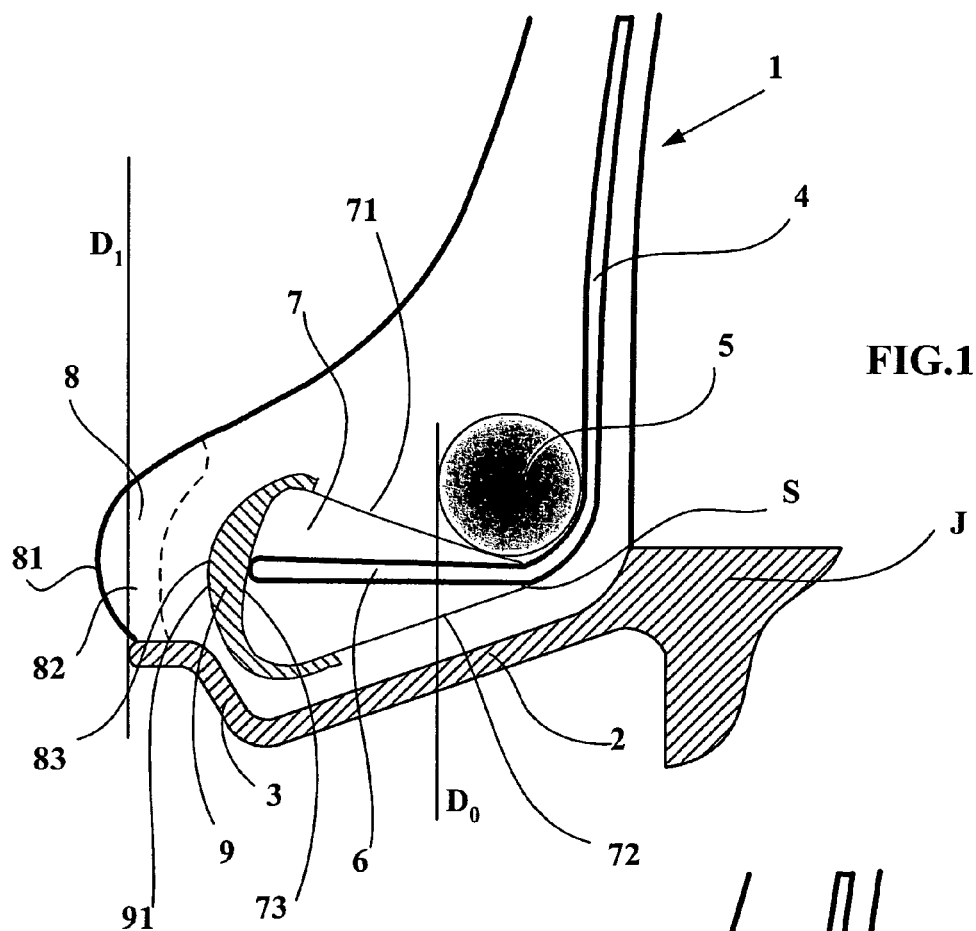
FIG. 1: view in meridian section of a first variant embodiment comprising a bead protection profile of non-uniform thickness.

In FIG. 1 there can be seen a section in a meridian plane (that is to say containing the rotation axis of the tire) of a bead 1 of a tire according to a first variant of the invention. In this variant, there can be seen a seat 2 of a rim J inclined towards the outside (that is to say whose points axially furthest towards the outside are on a circle with a smaller diameter than the circle on which the points axially furthest towards the inside are situated) extended axially to the outside by a low projection 3 or "hump". On this seat 2 is mounted a tire bead 1 comprising a carcass reinforcement 4 wound around a bead wire 5 in order to form an upturn 6. This carcass reinforcement 4 is formed by a mixture of rubber, preferentially low loss, in order to reduce the resistance of the tire to running, and reinforcements in the form of wires or cables disposed radially in the tire (that is to say at an angle equal to or close to 90° to the circumferential direction); in the present case, the modulus at 10% of deformation of the rubber mixture of the carcass reinforcement 4 is approximately 3.4 MPa.

This upturn 6 extends axially inside the rubber wedge 7 having a top face 71 and a bottom face 72, the said two faces being joined by a lateral face 73 situated axially to the outside (that is to say on the same side as the projection 3 on the rim J). The vertex S opposite to the lateral face 73 of the rubber wedge 7 is located radially inside the bead wire 5 and axially inside a straight line $D_0$ perpendicular to the rotation axis and tangent axially to the outside of the said bead wire 5, so as to create a cooperation between the said wedge 7 and the said bead wire in order to constitute a device for anchoring the carcass reinforcement 4.

The bead wire 5 can be a wire of the braided type, that is to say a wire formed from a core around which there are wound one or more wires or cables in one or more layers. In an equivalent fashion, the bead wire can be replaced by a plurality of cables wound circumferentially and disposed on the same side or on each side of the carcass reinforcement, as described for example in the application WO 01/39999.

In this first variant according to the invention, the upturn on the carcass divides the rubber wedge 7 substantially into two equal parts in order to terminate on or close to the lateral face 73 of the said wedge.

Axially outside the bead 1 and coming into abutment on the projection 3 of the rim J, the bead 1 comprises a part 8 forming a protuberance made from a mixture of rubber having a modulus of 15 MPa. In addition to the fact that this protuberance 8 projects axially towards the outside of the rim projection (that is to say axially beyond a straight line $D_1$ perpendicular to the rotation axis and tangent axially to the outside of the projection 3) in order to protect the latter from any impacts and rubbing, the said protuberance 8 comprises, on its face 81, visible from the outside, a plurality of ribs 82 parallel to each other and oriented substantially in the meridian direction.

On the lateral face 73 of the rubber wedge 7 and axially inside the internal face 83 of the protuberance 8, there is disposed a bead protection profile 9 made from a mixture of rubber having a modulus at 10% of deformation greater than the modulus at 10% of deformation of the material constituting the protuberance 8, and even more preferentially greater than 25 MPa; in the present case, the modulus at 10% of deformation of the bead protection profile 9 is 44 MPa.

Advantageously, this bead protection profile 9 encloses the rubber wedge 7 over its entire lateral face 73 and partially on its top face 71 and on the bottom face 72 of the said wedge 7. It has on the top and bottom faces a substantially constant thickness and a protrusion on the lateral face 73 of the wedge so as to further increase the protection of the wedge 7 and upturn 6.

This bead protection profile 9 makes it possible to localize the separation zone between the protuberance 8 and the remainder of the bead 4 when there is an impact with an external object; in this way, it is possible to prevent the carcass reinforcement or its upturn being visible.

Figure 2:
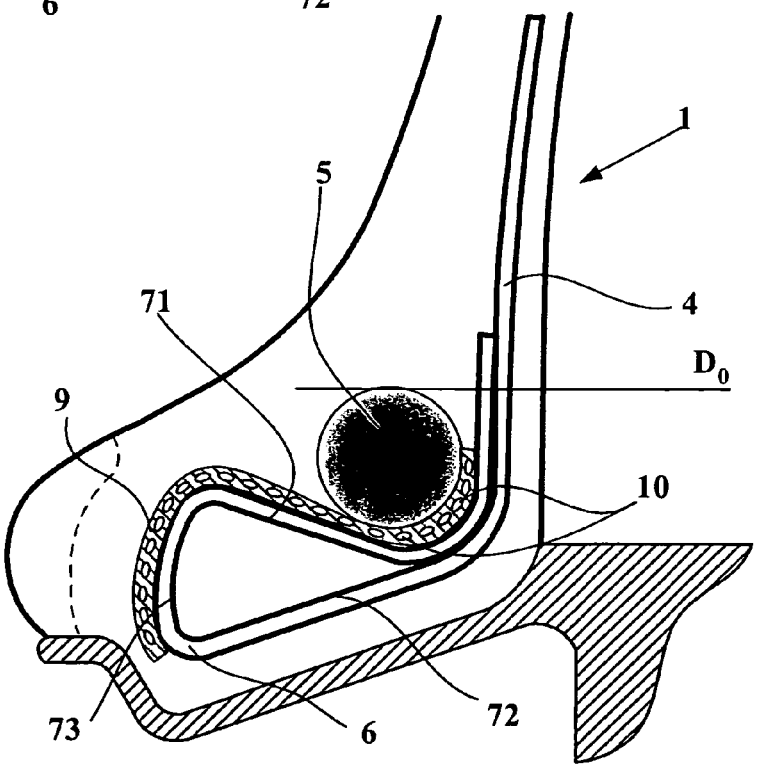
FIG. 2: view in meridian section of a second variant embodiment according to which the bead protection profile is extended over the carcass upturn under and along the bead wire.

In FIG. 2, another variant of a tire bead 1 according to the invention is drawn, according to which the upturn 6 of the carcass reinforcement 4, instead of passing inside the rubber wedge 7 of the anchoring device, passes radially inside the said wedge 7 running along its internal face 72 and then along the lateral face 73 of the said wedge before running along the external face 71 of the wedge in order to pass radially below the bead wire 5 again and terminate radially outside a straight line D0 parallel to the rotation axis of the tire and passing through the point on the bead wire 5 radially furthest to the outside.

In this variant, the same components are provided as those described with the first variant (FIG. 1) except that the bead protection profile 9 with a substantially uniform thickness covers the upturn 6 in its part running along the lateral face 73 of the wedge 7 and in its part running along the external face 71 of the said wedge. Advantageously, this profile 9 is extended between the bead wire 5 and the carcass upturn 10. Also advantageously, this profile 9 can be reinforced by a plurality of reinforcements 10 in the form of cables or wires (inclined or not) or at least one canvas.

Finally, in the third variant shown with FIG. 3, the carcass upturn 6 no longer passes under the bead wire 5 again but is extended radially beyond the lateral face of the wedge 7 along a rubber profile 11 disposed axially and radially to the outside of the bead wire 5.

In this example, the modulus at 10% of deformation of the rubber profile 11 enclosing the bead wire 5 is 25 MPa and the moduli of the other rubber mixes are unchanged compared with those already stated for the previous variants (FIGS. 1 and 2).

To limit the effect of jamming of the protuberance 8 between any obstacle and the projection 3 on the rim J at the time of an impact, the said protuberance 8 is radially offset by a distance h with respect to the said projection 3 so as no longer to be in contact with it.

Axially outside the carcass upturn, there is disposed a rim protection profile 9 with a substantially uniform thickness; this profile follows the upturn 6 over the entire lateral face 73 of the wedge 7 and going at least as far as a level corresponding to the radially outermost part of the bead wire 5 (this level is represented in FIG. 3 by a straight line $D_2$ parallel to the rotation axis of the tire). This same protection profile could also be extended radially beyond the end 61 of the upturn 6.

Advantageously, a thickness of rubber 51 of the same nature as the bead protection profile is disposed between the bead wire 5 and the carcass reinforcement 4 in order to reduce the risks of contact between the said bead wire and reinforcement.

The invention is not limited to the examples described and depicted and various modifications can be made thereto without departing from its scope. In particular, the provisions of a variant described with the support of a figure can easily be combined in whole or in part with those of another variant according to requirements. Likewise, this invention is applicable to a tire whether there be only one or two beads mounted on a rim seat inclined towards the outside.

What is claimed is:

1. A tire comprising:
two beads intended to be in contact with a mounting rim (J), at least one of the said beads having a bead seat inclined towards the outside, this bead comprising an anchoring device formed by at least one circumferential bead reinforcement element and a wedge made from rubber mix with a high hardness (modulus at 10% deformation at least equal to 25 MPa) and with a substantially triangular shape delimited by a top face radially to the outside, a bottom face radially to the inside and a lateral face axially to the outside connecting the previous two faces, this wedge having a vertex (S), opposite to the lateral face, situated radially to the inside of the circumferential bead reinforcement element,
a radial carcass reinforcement formed from a rubber mix reinforced by a plurality of reinforcements forming, in the tire, an angle equal to or close to 90° to the circumferential direction, this carcass reinforcement being anchored in each bead having a seat inclined towards the outside to an anchoring device, passing radially inside the circumferential bead reinforcement element and going from the inside to the outside of the tire in order to form an upturn extending over or in the wedge made from rubber mix,
and axially to the outside of the lateral face of the wedge, a protuberance made from rubber mix forming the portion axially furthest towards the outside of each bead having a seat inclined towards the outside, this protuberance being provided for axially protecting the rim (J) against abrasion and impacts when the tire is mounted on its mounting rim,
wherein each bead, having a seat inclined towards the outside, comprises, between the protuberance axially towards the outside of the said bead and the lateral face of the wedge, a bead protection profile with a thickness at least equal to 0.3 mm made from rubber mix whose modulus at 10% deformation is greater than the modulus of the material constituting the said protuberance and in that the modulus at 10% deformation of the material forming the protuberance is between 8 and 20 MPa.

2. The tire according to claim 1 wherein the rubber mix of the rim protection profile has a modulus at 10% deformation greater than 25 MPa.

3. The tire according to claim 1 wherein the upturn of the carcass reinforcement is in at least partial contact with one of the bottom or top faces of the wedge of the anchoring device and in that the rim protection profile covers, apart from the lateral face of the said wedge, the said upturn.

4. The tire according to claim 1 wherein the circumferential rim reinforcement elements constitute a bead wire.

5. The tire according to claim 4 wherein, between the bead wire and the carcass reinforcement, there is placed a profile made from rubber mix, the modulus of the material of this profile being identical to that of the bead protection profile.

6. The tire according to claim 5 wherein the bead protection profile is extended so as to pass between the bead wire and the carcass reinforcement.

7. The tire according to claim 1 wherein the bead protection profile is reinforced by fibers, wires, cables or at least one canvas.

8. The tire according to claim 1 wherein the protuberance forming the axially outermost portion of each bead having a seat inclined towards the outside is radially offset towards the outside of the projection axially outside the rim by a distance h.

9. The tire according to claim 2 wherein the upturn of the carcass reinforcement is in at least partial contact with one of the bottom or top faces of the wedge of the anchoring device and in that the rim protection profile covers, apart from the lateral face of the said wedge, the said upturn.

10. The tire according to claim 9 wherein the bead protection profile is reinforced by fibers, wires, cables or at least one canvas.

* * * * *